July 14, 1925.

J. J. SMITH 1,546,149

LOCKING DEVICE FOR VALVE FITTINGS

Filed May 1, 1924

ON LINE 3-3. FIG. 1.

INVENTOR
James J. Smith.
BY
ATTORNEY

Patented July 14, 1925.

1,546,149

UNITED STATES PATENT OFFICE.

JAMES J. SMITH, OF PHILADELPHIA, PENNSYLVANIA.

LOCKING DEVICE FOR VALVE FITTINGS.

Application filed May 1, 1924. Serial No. 710,308.

*To all whom it may concern:*

Be it known that I, JAMES J. SMITH, a citizen of the United States, and a resident of the city of Philadelphia, county of Philadelphia, State of Pennsylvania, have invented certain new and useful Improvements in Locking Devices for Valve Fittings, of which the following is a specification.

The present invention relates to valve fittings and more particularly to locking devices for preventing one part of a valve from becoming separated from another.

Some of the objects of the present invention are to provide a removable valve plug with means for preventing disconnection of said plug from its associated part under normal operating conditions; to provide means for preventing a closure of a valve fitting from being detached from the fitting and lost; to provide a threaded valve closure with means operative under a rotary movement of said closure to limit the movement of said closure in one direction; to provide a locking device for valve closures which locks the closure to its fitting under rotary movement but releases the valve closure under lineal pressure; and to provide other improvements as will hereinafter appear.

Figure 1:
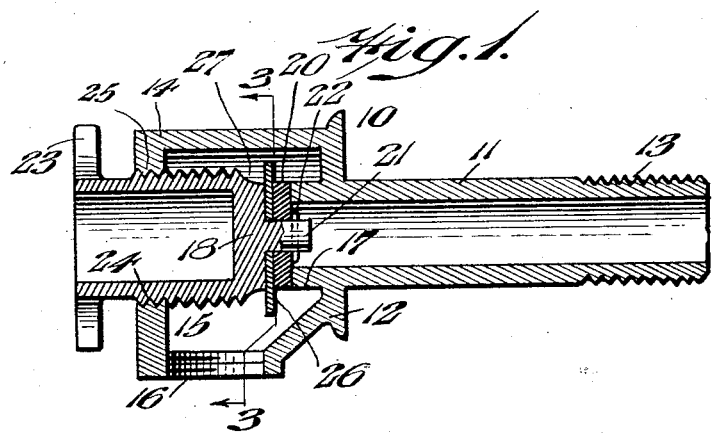
Figure 2:
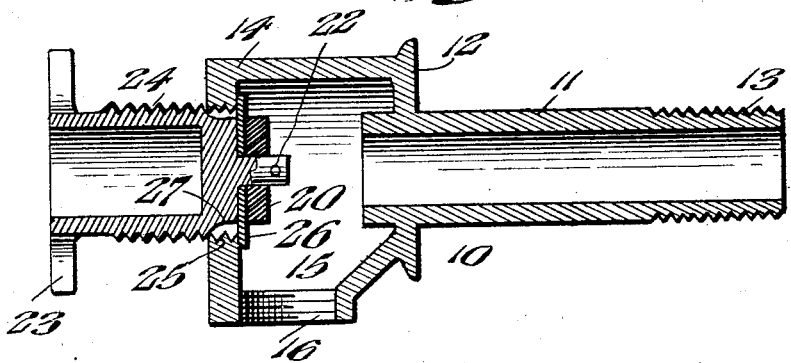
Figure 3:
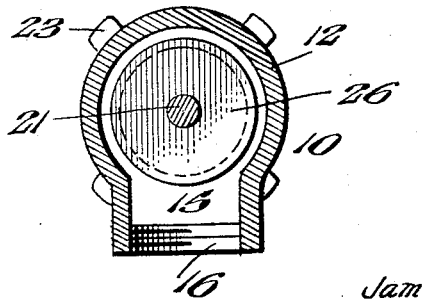

In the accompanying drawings, Fig. 1 represents a longitudinal section of a valve fitting embodying one form of the present invention; Fig. 2 represents a similar section showing the valve closure in open position; Fig. 3 represents a section on line 3—3 of Fig. 1.

Referring to the drawings, one form of the present invention is shown as applied to a fitting 10, such for example as employed as a discharge valve for ice cream cabinets, though it will be understood the invention is not limited to this particular type of fitting but may be applied to any suitable fitting. In the present instance, the fitting 10 comprises a tubular extension 11 which is arranged to pass through the wall of the cabinet to which it is attached and be held rigidly connected thereto by reason of a ring flange 12 abutting the outer face of the cabinet wall, and a suitable clamping flange (not shown) is threaded upon the end 13 of the extension and serves to clamp the device in operative position. In the present construction, the flange 12 forms a part of a hollow body 14 forming a discharge chamber 15 in communication with a discharge outlet 16, which is at right angles to the direction of flow through the extension 11. The extension 11 preferably has an annular valve seat 17 projecting into the chamber 15 so that the seat can be repeatedly reground and renewed.

For the purpose of controlling the flow to the chamber 15 through the extension 11 by way of the opening in the valve seat 17 a valve closure 18 is provided, carrying the customary washer valve 20 upon a stem 21, to which it is held by a cotter pin 22 or like fastening means. As here shown, the valve closure 18 is of tubular construction and provided on its projecting outer end with lugs 23 by which it can be turned to cause its threaded outer surface 24 to feed through the opening 25 of the body 14 and thus move the washer valve 20 toward or away from the valve seat 17.

In order to prevent the valve closure 18 from being disconnected from the body 14 by rotary motion in a direction to cause it to be unscrewed from its position, there is mounted upon the stem 21 a locking washer or disc 26 of general circular contour which has a diameter slightly greater than the diameter of the threaded opening 25 of the body 14, and in this connection it should be noted that the valve closure 18 has an unthreaded neck portion 27 extending from one face of the disc 26 to the threaded portion 24 a distance substantially equal to the thickness of the wall of the body 14 in which the opening 25 is located.

Under normal operating conditions, the opening and closing of the valve 20 is accomplished by either feeding the screw threaded valve closure 18 in the direction to advance the valve 20 to its seat or in the opposite direction to move it away from it, and when this latter takes place it may be rotated until the closure 18 has reached a point where the locking disc 26 comes into engagement with the inner face of the body. At this time the screw threaded portion of the closure 18 has fed out of the cooperating thread of the body 14, and therefore continued rotation of the closure 18 will not cause any further outward movement of the closure, and the two parts, that is, the valve closure 18 and the body 14, will be held together by the disc 26 pressing against the inner wall of the body 14 and resisting the withdrawal of the closure 18. Should it be necessary for any reason to actually detach the valve closure 18 from the fitting, it can be done by a direct outward pull, because the flexibility of the locking washer 26 in its wet condition will permit it to bend sufficiently so that it may be pulled through the threaded opening 25. Ordinarily, however, it is stiff enough to resist disconnection between the two parts, and in fact the user of the fitting considers the valve closure 18 merely as a rotatable device, and when it fails to become detached by the usual unscrewing movement, the user leaves it in the open position still attached to the fitting.

Although but one form is shown in which this invention may be embodied, it is to be understood that the invention is not limited to any specific construction, but might be applied in various forms without departing from the spirit of the invention or the scope of the appended claims.

Having thus described my invention, I claim:

1. In a valve construction, a fitting provided with a valve seat and a threaded opening, a valve part arranged to thread into said opening, a valve on said part arranged to engage said seat, and a flexible disc carried by said part having a diameter greater than the diameter of said opening and arranged to abut said fitting in one position of said valve part to prevent the said part from being removed during rotary movement but yielding during linear movement of said part to allow said part and fitting to be disconnected.

2. In a valve construction, a fitting provided with a valve seat and a threaded opening, a valve part arranged to thread into said opening, a valve on said part arranged to engage said seat, a flexible disc carried by said part having a diameter greater than the diameter of said opening and arranged to abut said fitting in one position of said valve part to prevent the said part from being removed during rotary movement, and an unthreaded portion on said part adjacent said disc, whereby said part can be given a linear movement to cause said disc to flex and pass through said opening.

Signed at Philadelphia, in the county of Philadelphia, and State of Pennsylvania, this 29th day of April, 1924.

JAMES J. SMITH.